(12) United States Patent
Matti et al.

(10) Patent No.: US 11,428,283 B2
(45) Date of Patent: Aug. 30, 2022

(54) BRAKE DISC ASSEMBLY

(71) Applicant: FRENI BREMBO S.P.A., Curno (IT)

(72) Inventors: Andrea Matti, Curno (IT); Hydra Rossi, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 99 days.

(21) Appl. No.: 16/643,021

(22) PCT Filed: Aug. 30, 2018

(86) PCT No.: PCT/IB2018/056632
§ 371 (c)(1),
(2) Date: Feb. 28, 2020

(87) PCT Pub. No.: WO2019/043616
PCT Pub. Date: Mar. 7, 2019

(65) Prior Publication Data
US 2020/0191213 A1    Jun. 18, 2020

(30) Foreign Application Priority Data

Aug. 31, 2017    (IT) .......................... 102017000097892

(51) Int. Cl.
  *F16D 65/12*    (2006.01)
  *F16D 65/02*    (2006.01)
(52) U.S. Cl.
  CPC .... *F16D 65/123* (2013.01); *F16D 2065/1304* (2013.01); *F16D 2065/1384* (2013.01); *F16D 2065/1392* (2013.01)
(58) Field of Classification Search
  CPC ........... F16D 65/123; F16D 2065/1304; F16D 2065/1384; F16D 2065/1392;
(Continued)

(56) References Cited

U.S. PATENT DOCUMENTS

| | | | | |
|---|---|---|---|---|
| 4,501,346 A | * | 2/1985 | Bogenschutz | ........ F16D 65/128 188/218 XL |
| 6,267,210 B1 | * | 7/2001 | Burgoon | ............. F16D 65/0006 188/218 XL |

(Continued)

FOREIGN PATENT DOCUMENTS

| | | |
|---|---|---|
| EP | 1466106 B1 | 7/2008 |
| JP | H09166168 A | 6/1997 |

(Continued)

OTHER PUBLICATIONS

European Patent Office, International Search Report with Written Opinion, issued in PCT/IB2018/056632, dated Nov. 27, 2018, 14 pages, European Patent Office, Rijswijk, Netherlands.

*Primary Examiner* — Robert A. Siconolfi
*Assistant Examiner* — James K Hsiao
(74) *Attorney, Agent, or Firm* — Marshall & Melhorn, LLC

(57) ABSTRACT

A brake disc assembly may have a brake band, a bell, and at least one connecting device, which forms a connection between the brake band and the bell. The connecting device and the bell cooperate by delimiting at least one axial band seat where the brake band may slide in an axial direction of a predetermined axial stroke. The bell may have at least a first end-of-stroke surface which forms a first abutment surface in the axial direction for the brake band. The connecting device may have a second end-of-stroke surface, opposite to said first end-of-stroke surface, which forms a second opposite abutment surface in the axial direction for the brake band.

10 Claims, 10 Drawing Sheets

(58) Field of Classification Search
CPC ..... F16D 2065/1364; F16D 2200/0021; F16D 2250/00; F16D 2250/0084; B60B 27/00
See application file for complete search history.

(56) References Cited

U.S. PATENT DOCUMENTS

| | | | |
|---|---|---|---|
| 6,604,613 B2* | 8/2003 | Burgoon | F16D 65/0006 188/218 XL |
| 6,619,440 B2* | 9/2003 | Antony | B60T 1/065 188/17 |
| 6,880,682 B2* | 4/2005 | Gotti | B60B 27/001 188/218 R |
| 7,104,368 B2* | 9/2006 | Cornolti | F16D 65/123 188/18 A |
| 7,780,243 B2* | 8/2010 | Lippis | F16D 65/12 301/6.1 |
| 7,963,375 B2* | 6/2011 | Pahle | B60T 8/329 188/218 XL |
| 8,511,442 B2* | 8/2013 | Mueller | F16D 65/128 188/218 XL |
| 8,651,247 B2* | 2/2014 | Burgoon | F16D 65/123 188/218 XL |
| 8,985,285 B2* | 3/2015 | Finch, Jr. | B61H 5/00 188/218 XL |
| 9,051,632 B2* | 6/2015 | Kim | C22C 21/08 |
| 9,482,300 B2* | 11/2016 | Walther | F16D 65/123 |
| 9,566,957 B2* | 2/2017 | Root | B60B 27/0052 |
| 9,897,154 B2* | 2/2018 | Root | B60B 27/0052 |
| 9,903,428 B2* | 2/2018 | Reulein | F16D 65/123 |
| 9,964,164 B1* | 5/2018 | Edwards | F16D 66/00 |
| 10,724,592 B2* | 7/2020 | Torstveit | F16D 65/12 |
| 10,794,441 B2* | 10/2020 | Kokott | F16D 65/123 |
| 2004/0182660 A1 | 9/2004 | Cavagna et al. | |
| 2005/0284712 A1* | 12/2005 | Cornolti | F16D 65/123 188/218 XL |
| 2006/0011424 A1* | 1/2006 | Goodell | B60C 29/06 188/218 A |
| 2006/0091719 A1* | 5/2006 | Cowling | F16D 65/123 301/6.1 |
| 2009/0218183 A1* | 9/2009 | Burgoon | F16D 65/12 188/218 XL |
| 2010/0051397 A1* | 3/2010 | Kim | F16D 65/12 188/218 XL |
| 2010/0307875 A1* | 12/2010 | Ilg | F16D 65/123 188/218 XL |
| 2011/0067963 A1* | 3/2011 | Pahle | F16D 65/12 188/218 XL |
| 2012/0247882 A1* | 10/2012 | Root | F16D 65/12 188/18 A |
| 2015/0069818 A1* | 3/2015 | Hester | B60B 27/0052 301/6.8 |
| 2015/0369313 A1* | 12/2015 | White | F16D 65/12 188/218 XL |
| 2016/0319893 A1* | 11/2016 | Reulein | F16D 65/126 |
| 2017/0030423 A1* | 2/2017 | Comenduli | F16D 65/128 |
| 2017/0074337 A1* | 3/2017 | Borner | F16D 65/123 |
| 2017/0198773 A1* | 7/2017 | Scheibe | F16D 65/12 |
| 2018/0180121 A1* | 6/2018 | Jones | F16D 65/123 |
| 2018/0222250 A1* | 8/2018 | Nakagawa | B60B 3/16 |
| 2018/0313417 A1* | 11/2018 | White | F16D 65/0025 |
| 2019/0024737 A1* | 1/2019 | Higle | F16D 65/123 |
| 2019/0063524 A1* | 2/2019 | Booher | F16D 65/123 |
| 2019/0315156 A1* | 10/2019 | Nakagawa | B60B 3/16 |

FOREIGN PATENT DOCUMENTS

| | | |
|---|---|---|
| WO | 01/36836 A1 | 5/2001 |
| WO | 03/001076 A1 | 1/2003 |
| WO | 03/089802 A1 | 10/2003 |

* cited by examiner

BRAKE DISC ASSEMBLY

FIELD OF THE INVENTION

The present invention relates to a brake disc assembly.

In particular, the present invention relates to a brake disc assembly comprising a brake band and a bell made in separate pieces and assembled by using at least one connecting device.

The present invention further relates to a male element of said connecting device.

PRIOR ART

In a disc brake, the brake caliper is generally arranged straddling the outer peripheral margin of a brake disc, adapted to rotate about a rotational axis defining an axial direction (X-X). In a disc brake, a radial direction (R-R), which is substantially orthogonal to said axial direction (X-X), and a tangential (T-T) or circumferential direction (T-T), orthogonal to both said axial direction (X-X) and said radial direction (R-R), is further defined.

Many brake disc embodiments currently provide making a brake band on which the disc brake caliper acts to generate the braking torque, separate from the bell which is intended to be fixed to the wheel hub. In this manner, the brake band can be made of a material different from that used for manufacturing the bell. Typically, the brake band is made of a material highly resistant to friction wear, such as spheroidal carbon cast iron or composite material, e.g. as shown in document WO-03-001076 by the Applicant. At the same time, the bell may be made of a lighter material than that of the brake band, e.g. aluminum, particularly to respond to the need of reducing the weight of the unsprung vehicle weights.

The connection between brake band and bell is very important because it ensures the transfer of braking torque from band to bell. The tangential constraint between brake band and bell can be made with systems which provide protuberances of the brake band which couple in respective seats of the bell in order to achieve a tangential constraint system between band and bell having a particularly simple structure and therefore low production costs. Otherwise, the tangential constraint between brake band and bell may be achieved by using bushes or fixing pins designed to form a secure connection between axially overlapped portions of the brake band and the bell, e.g. as shown in document WO-03-089802 by the Applicant.

As known, a brake caliper body comprises two opposite elongated portions facing the opposite braking surfaces of the brake band of the disc brake, and at least one caliper bridge to connect said opposite elongated portions to each other by placing the caliper body straddling the brake disc. During the braking action, thrust means, usually hydraulically or electro-mechanically actuated cylinder-piston assemblies, determine that at least one pair of opposite brake pads with which the brake caliper is provided abut against the opposite surfaces of the brake band of the disc brake, producing friction for the braking action when operated.

In conditions of prolonged use and particularly on high-performance vehicles in which high friction is generated between brake pads and disc as a result of fast decelerations, a different wear of the friction material of the opposite brake pads is typically found, which necessarily implies an imbalance of forces acting on the opposite braking surfaces of the brake disc and consequently of the reactions on the caliper body. This problem is further exacerbated by the manufacturing and assembly tolerances of the disc brake components, such as, for example, the manufacturing tolerances of the bell and the operating tolerances of the elements of the brake caliper, e.g. of the thrust means and of the associated actuating system.

For these reasons, in a disc brake it is usually known to provide an axial elastic preload on the brake band, preload which, however minimal, allows the brake band to slide, or float axially, in order to settle substantially halfway between the opposite pads of the brake caliper.

Such axial float prevents the disc from being rigidly constrained in axial direction and consequently prevents portions of the disc from being plastically deformed due to the imbalance of the stresses caused by asymmetric clamping applied by the pads on the disc, as well as due to the thermal stresses which induce deformations of different extent on the material of the bell and on the material of the brake band.

Typically, the axial float occurs by sliding of the brake band, biased by elastic preload means, on the outer surface of the connecting pin or a bush fitted thereon. An example of solution of this type is shown in document WO-01-36836 which provides a preload spring interposed between a brake band wall and the underhead of the pin connection to elastically bias the brake band away from the underhead of the pin, forcing it into axial abutment against the bell, so that such pin cooperates with the spring to tightly clamp brake band and bell.

Solutions of this type, in which the connecting pin tightly clamps brake band and bell, force the bell to slide axially on the connecting pin together with the brake band, resulting in premature damage due by wear of the material of the bell which slides on the pin surface. Indeed, as is known, the material of which the bell is made is usually softer than the material of the brake band, because a component which is as light as possible is desirable, and is therefore intended to wear rapidly by friction. In some cases, this may require a frequent replacement of the bell only or of the entire disc brake.

Document U.S. Pat. No. 6,604,613 shows a solution in which a bush comprising an annular protrusion is fitted on the connecting pin whereby forming with such protrusion a first abutment for the axial sliding of the brake band and forming a second abutment with a further protrusion, in the latter case for the bell. This solution, although advantageous because it avoids tightly clamping the brake band and the bell, however requires high manufacturing and assembly tolerances, particularly of the bushing and pin components and of their mutual threads, which by cooperating delimit the axial stroke or axial float of the brake band and constrain the bell.

Providing such axial float or end float requires maintaining the accesses to the bell and the brake band seats adapted to receive the connecting pins as isolated from the surrounding environment as possible, in order to limit the introduction of dust and debris, e.g. debris of the pad friction material and dust raised from the road surface, the latter particularly for applications on rally or off-road vehicles. Indeed, the accumulation of such dust and debris can prevent the axial mobility of the brake disc components with respect to the axial position of the caliper body.

For example, document EP-1466106 by the Applicant illustrates a pin solution which connects the brake band and the bell having an underhead portion having tangentially facing walls shaped so as to be inserted with minimal tangential clearance in a seat provided in the bell, so as to be able to abut against the facing walls of the bell seat to transfer the tangential braking action. Such pin is at the same time adapted to provide the necessary axial clearance, or axial float, which allows it to slide in relative axial direction between the brake band of the disc and the gripper body.

This solution, although advantageous from many points of view, does not fully solve the problem, because the relative axial motion between the underhead portion of the connecting pin and the bell seat walls implies a mutual rubbing which necessarily deteriorates the bell seat walls, obliging to make the bell itself of friction wear-resistant material in order to cope with the deterioration due to the prolonged rubbing action, or on the contrary by imposing a frequent replacement of the disc bell when this is made of aluminum or other soft material and therefore is light in weight.

The need is thus felt to provide a solution for the drawbacks mentioned with reference to the state of the art.

The need is strongly felt to provide a disc brake solution, in which the brake band is made in one piece separate from the bell, of increased resistance to wear compared to known solutions, without for this reason increasing the weight of the brake disc or increasing the number of components to be assembled.

The need is strongly felt to reduce the number of brake disc components, while allowing the brake band and the bell to be formed in separate pieces, without because of this determining a reduction of working life caused by the accumulation of dust and debris in the connection between brake band and bell and at the same time capable of ensuring a predetermined axial float between the brake band and the caliper body associable with the disc brake.

The need is felt to provide a brake disc solution which is light yet strong and which is simpler to assemble than known solutions and at the same time which is adapted for off-road vehicles, particularly high-performance vehicles, such as for example rally vehicles, without because of this causing an accumulation of debris and dust in the connection between brake band and bell.

SOLUTION

It is an object of the present invention to solve the drawbacks of the prior art and to provide a solution to the needs described hereto with reference to the prior art.

These and other objects are achieved by a brake disc assembly according to claim 1 and by a male element according to claim 7.

Some advantageous embodiments are the object of the dependent claims.

FIGURES

Further features and advantages of the brake disc assembly and of the male element of the connecting device will be apparent from the following description of its preferred embodiments, given by way of non-limiting examples, with reference to the accompanying figures, in which.

DESCRIPTION OF SOME PREFERRED EMBODIMENTS

Figure 1:
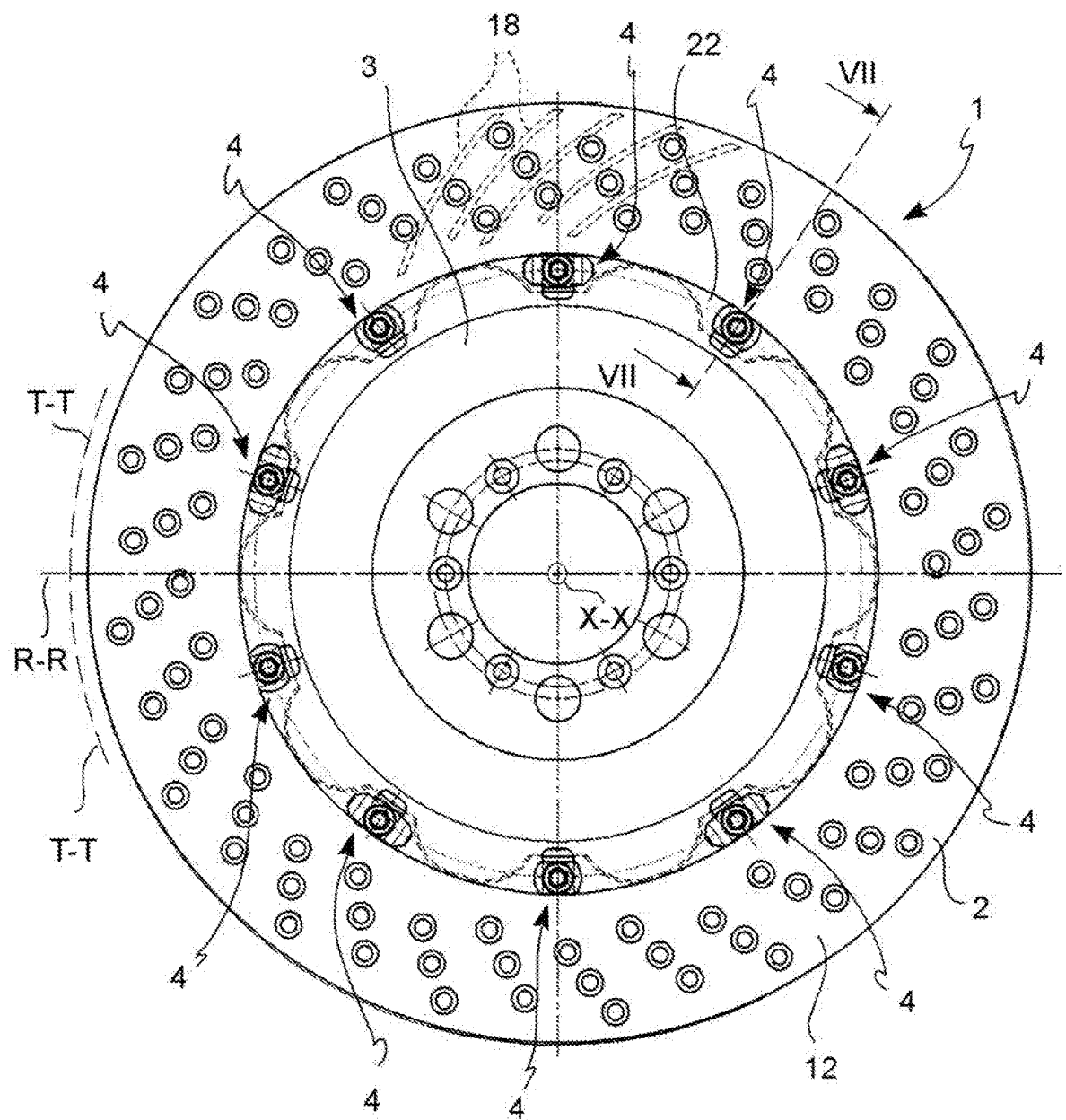
FIG. 1 is a plan view of a brake disc, according to an embodiment.
Figure 2:
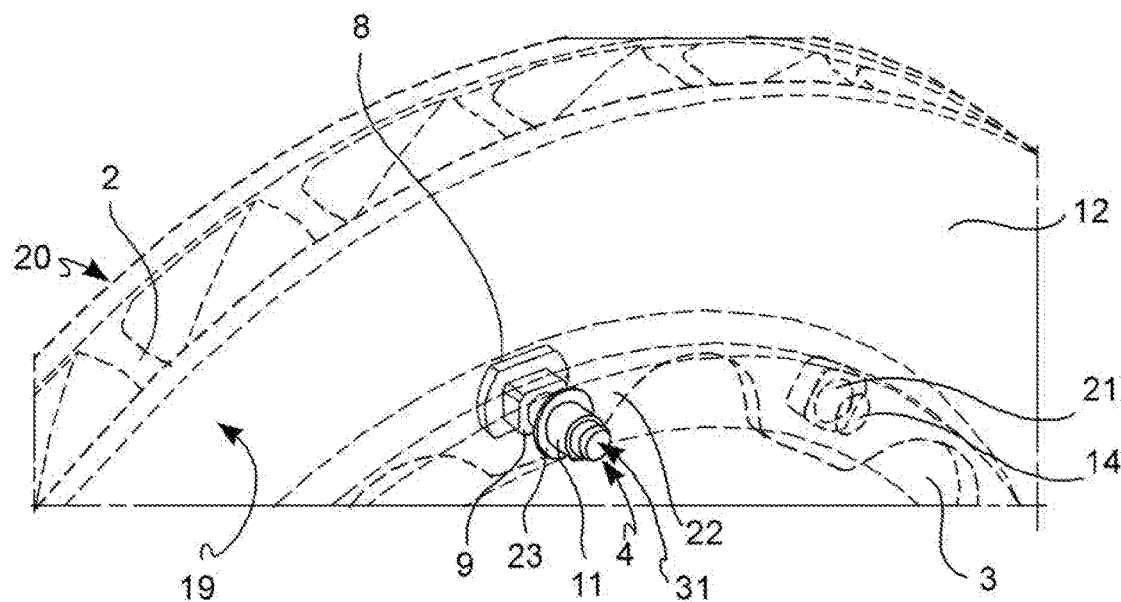
FIG. 2 is an axonometric view showing a brake band and bell portion with a dashed line for the sake of clarity together with a connecting device with a solid line, according with an embodiment, shown on the vehicle-wheel-oriented side of the brake band.
Figure 3:
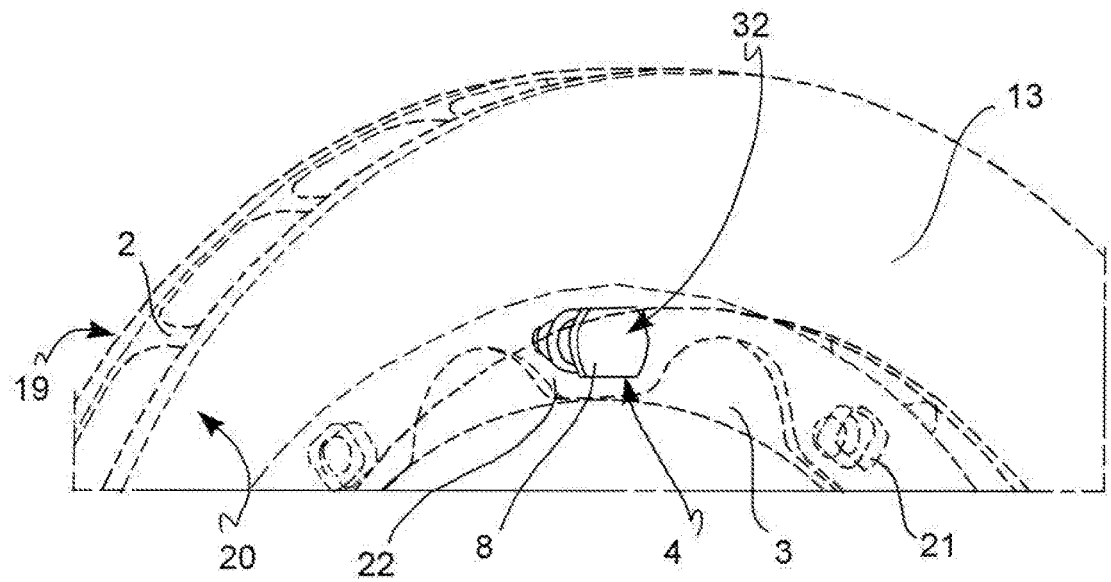
FIG. 3 is an axonometric view which shows the brake band and bell portion shown in FIG. 2 from the vehicle-oriented brake band side.
Figure 4:
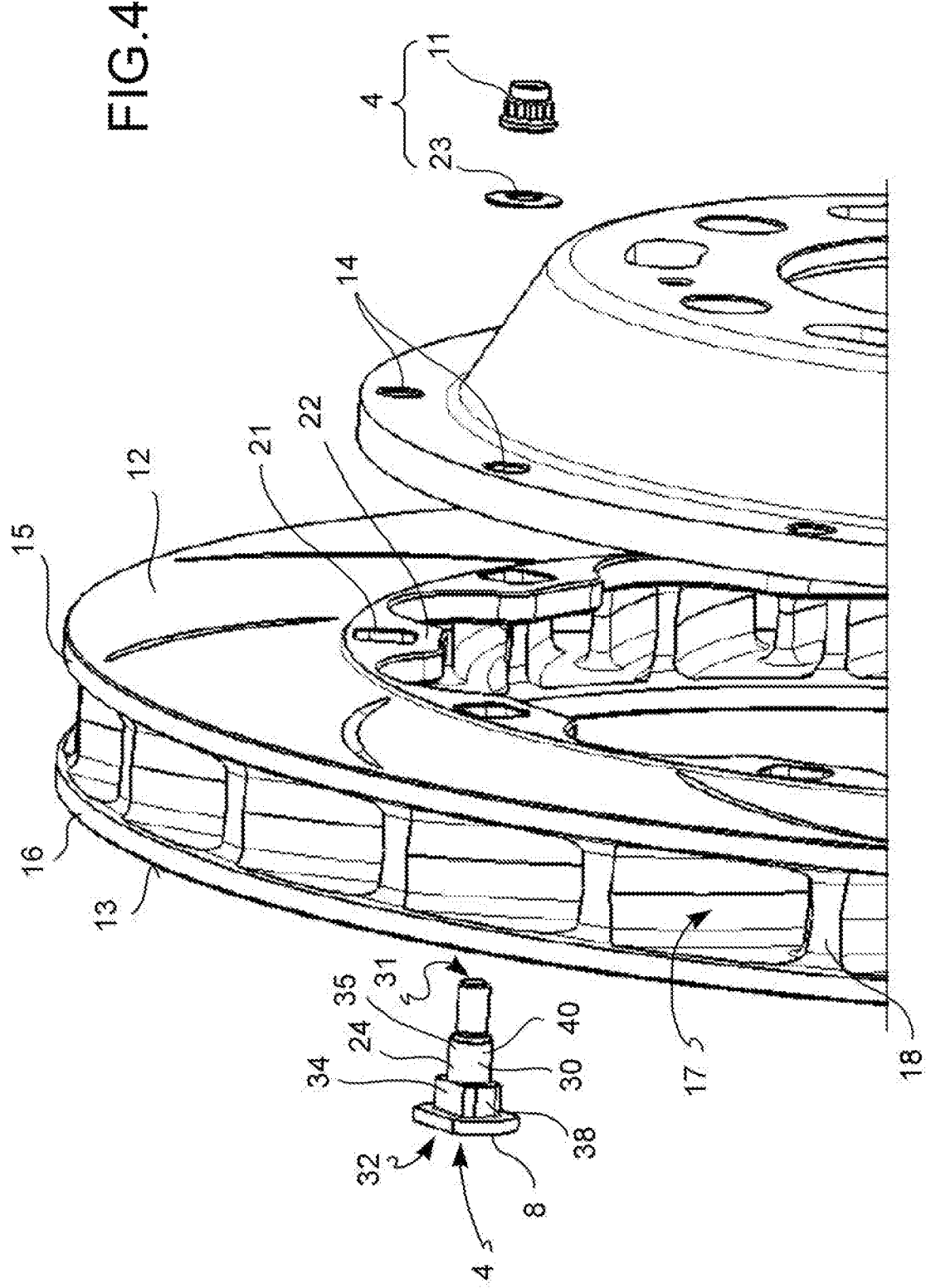
FIG. 4 is an axonometric view of parts separated for the sake of clarity which shows a portion of a brake disc assembly, according to an embodiment.
Figure 5:
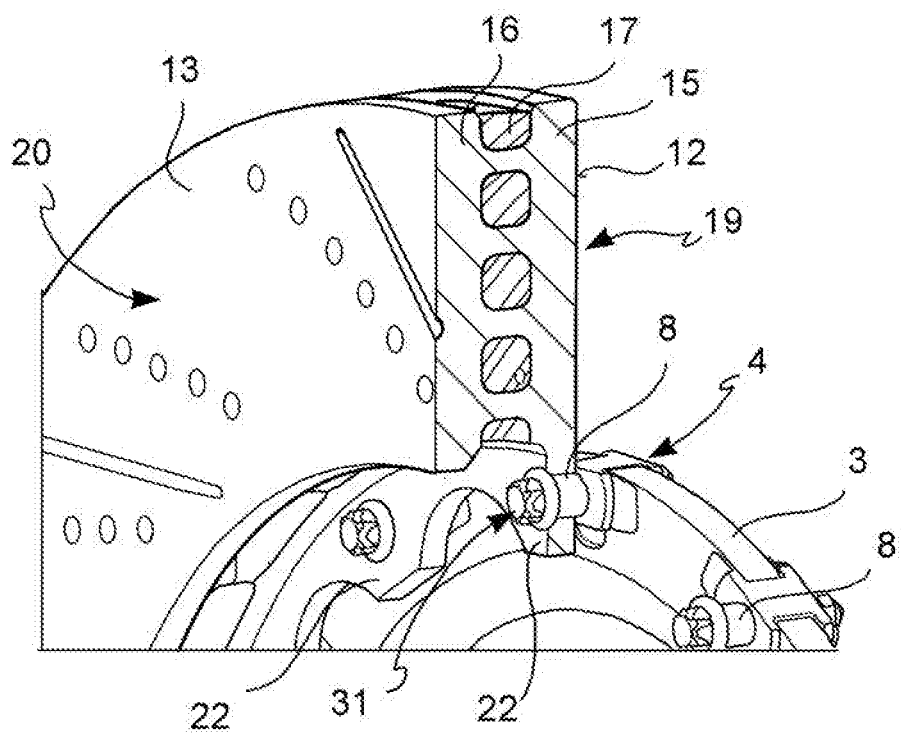
FIG. 5 is an axonometric view with some parts in section along a cutting plane directly along the axial and radial directions for the sake of clarity which shows a portion of a brake disc assembly, according to an embodiment.
Figure 6:
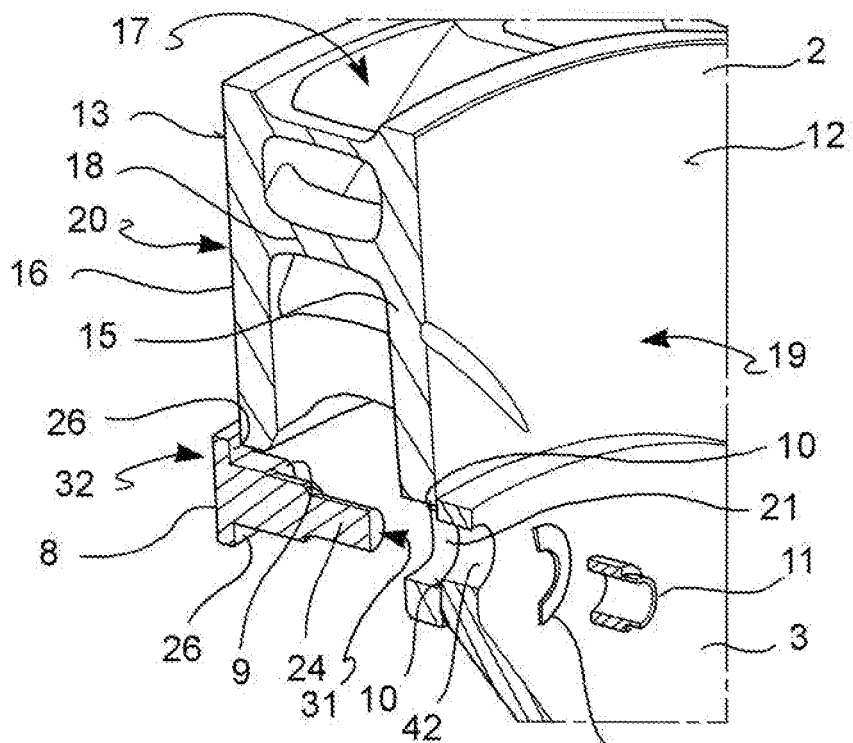
FIG. 6 is an axonometric and section view taken along a cutting plane directed along the axial and radial directions which shows a portion of a brake disc assembly with parts separated, according to an embodiment.
Figure 7:
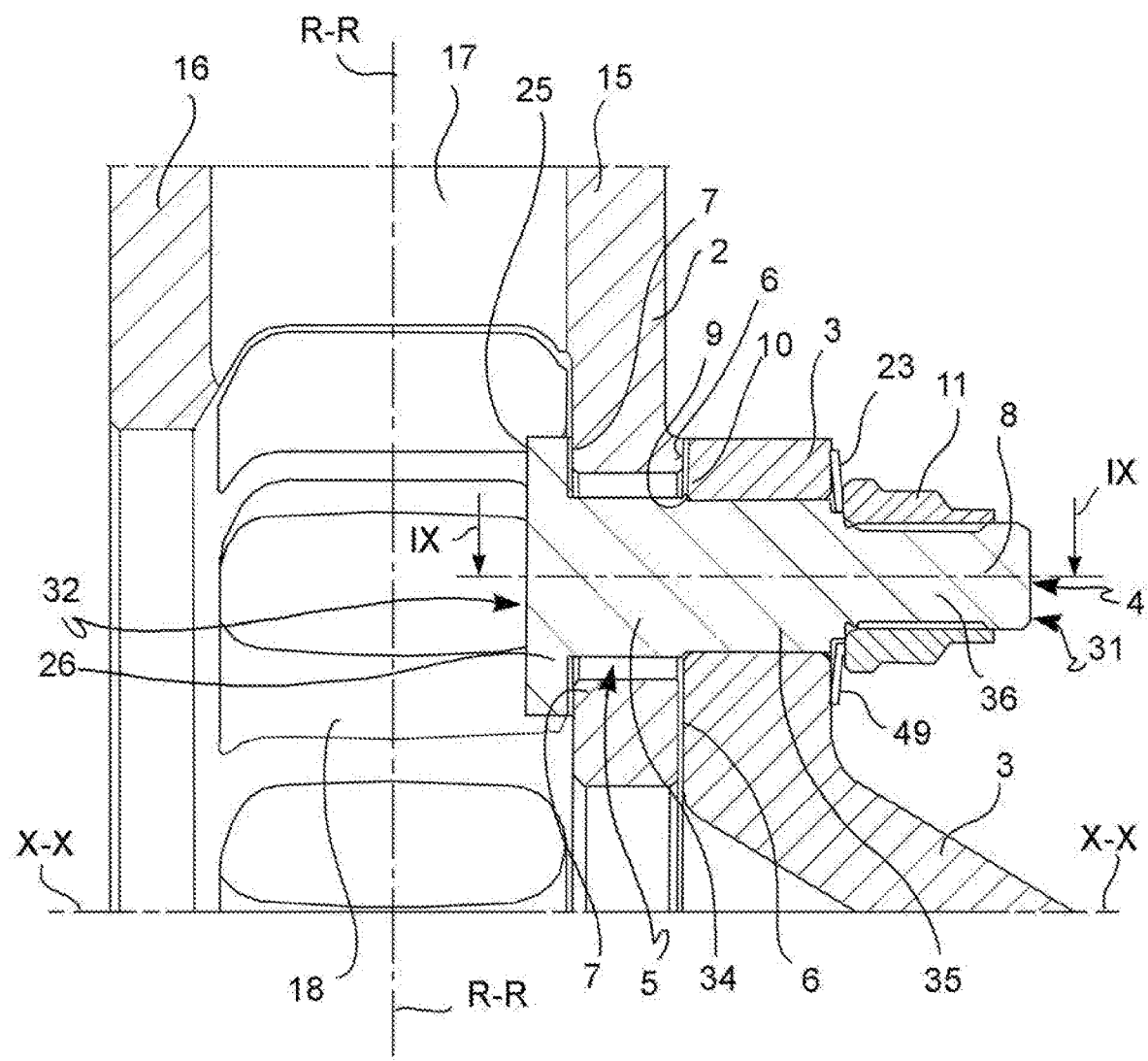
FIG. 7 is a section view taken along a cutting plane directed along the axial and radial directions, as indicated by arrows VII-VII in FIG. 1, which shows a portion of a brake disc assembly comprising a connecting device, according to an embodiment.
Figure 8:
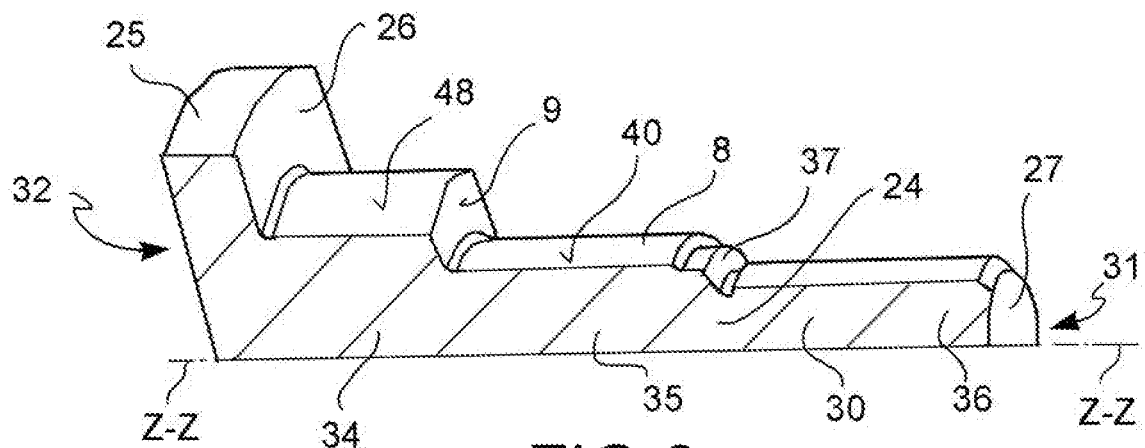
FIG. 8 is an axonometric section view of a portion of male element of a connecting device, according to an embodiment.
Figure 9:
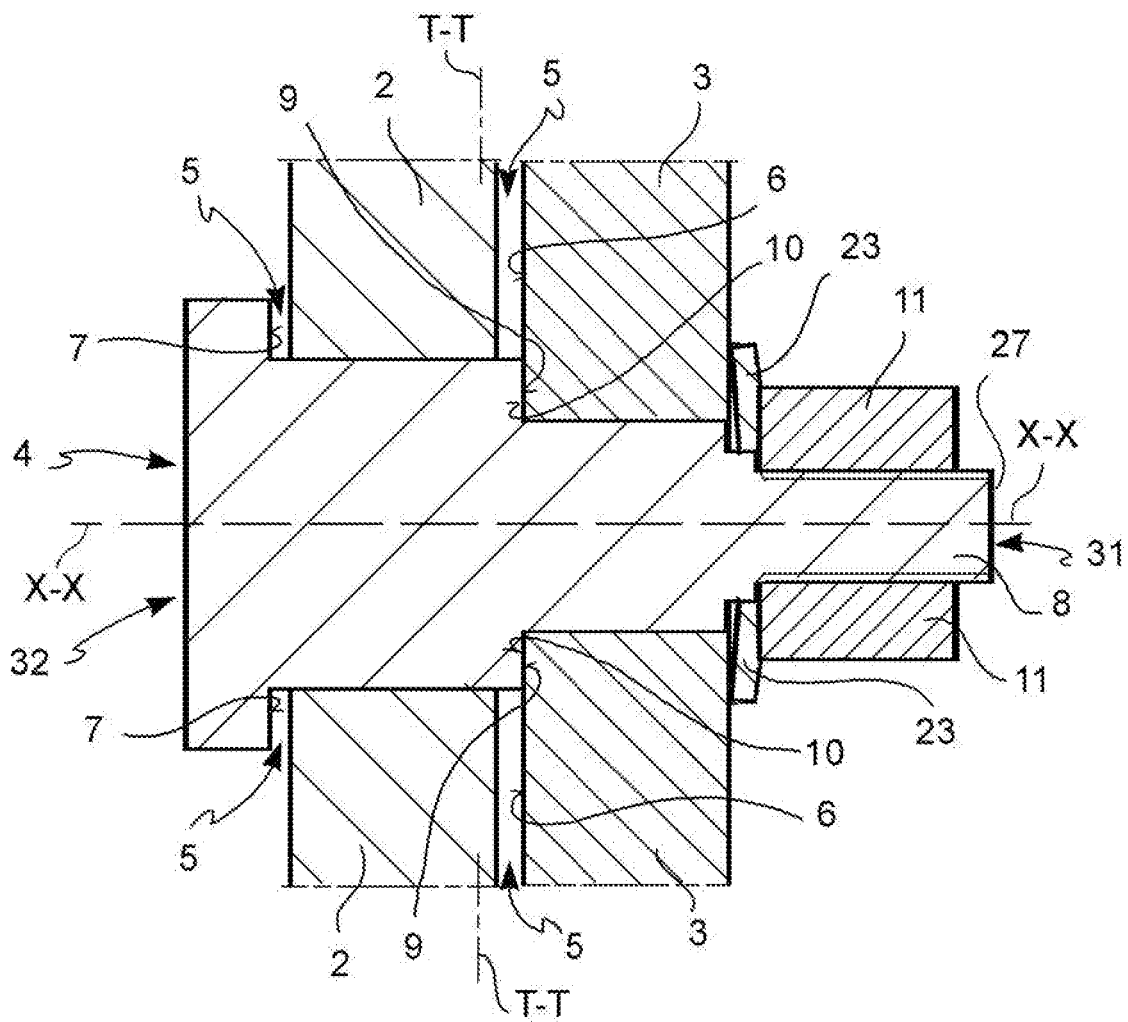
FIG. 9 is a section view taken along a cutting plane directed along the axial and tangential directions, as indicated by arrows IX-IX in FIG. 7, which shows a portion of a brake disc assembly comprising a connecting device, according to an embodiment.
Figure 10:
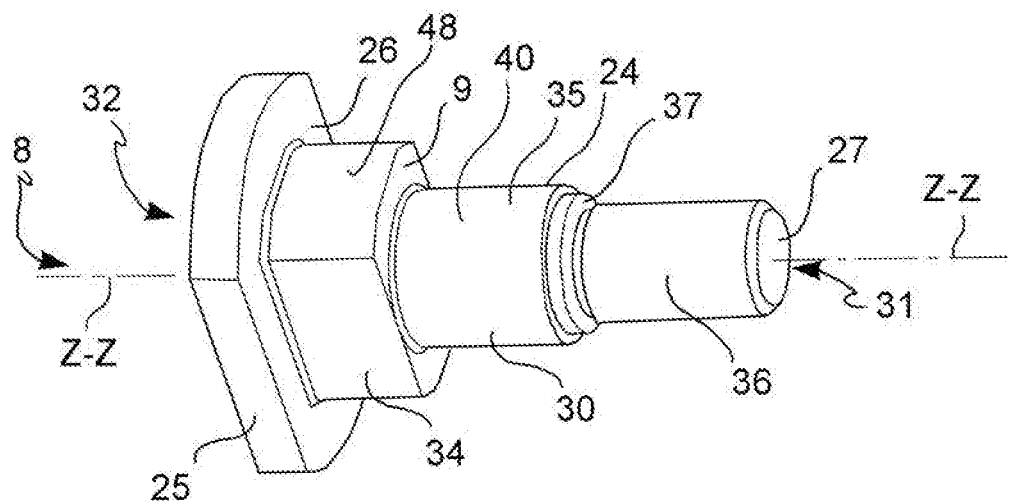
FIG. 10 is an axonometric view of a male element of a connecting device, according to an embodiment.
Figure 11:
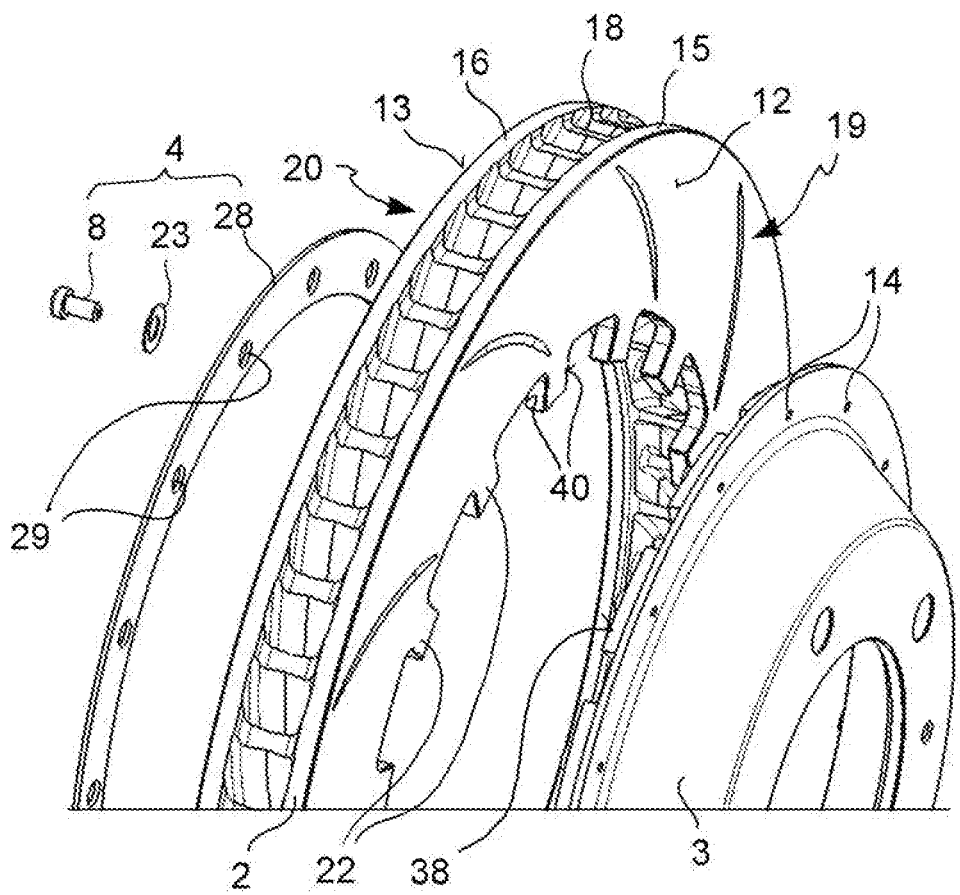
FIG. 11 is an axonometric view of parts separated for the sake of clarity which shows a portion of a brake disc assembly, according to an embodiment.
Figure 12:
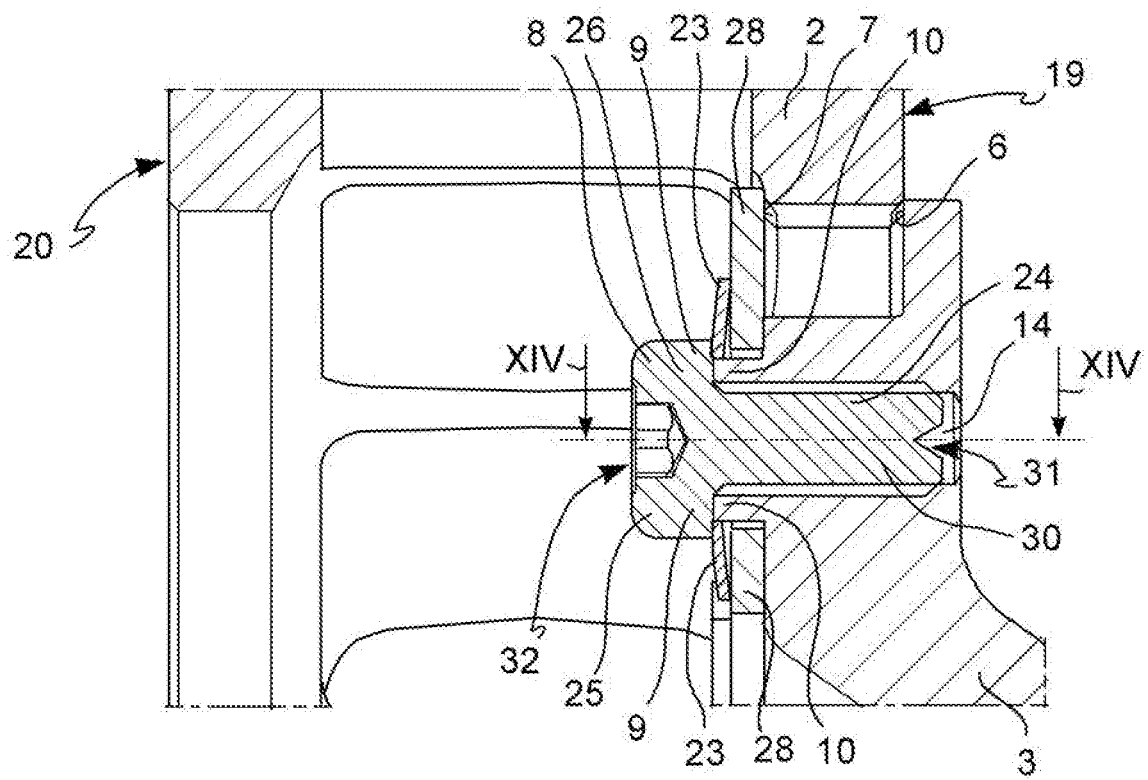
FIG. 12 is a section view taken along a cutting plane directed along the axial and radial directions, which shows a portion of a brake disc assembly comprising a connecting device, according to an embodiment.
Figure 13:
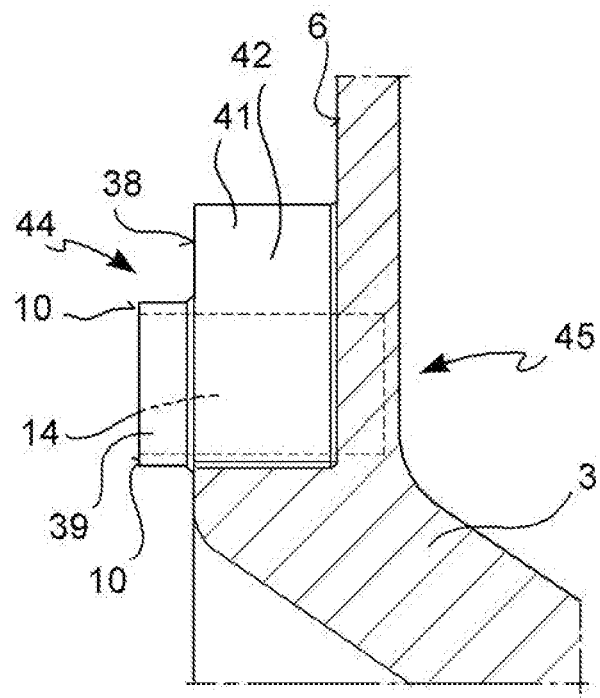
FIG. 13 is a section view of a portion of a bell, according to an embodiment.
Figure 14:
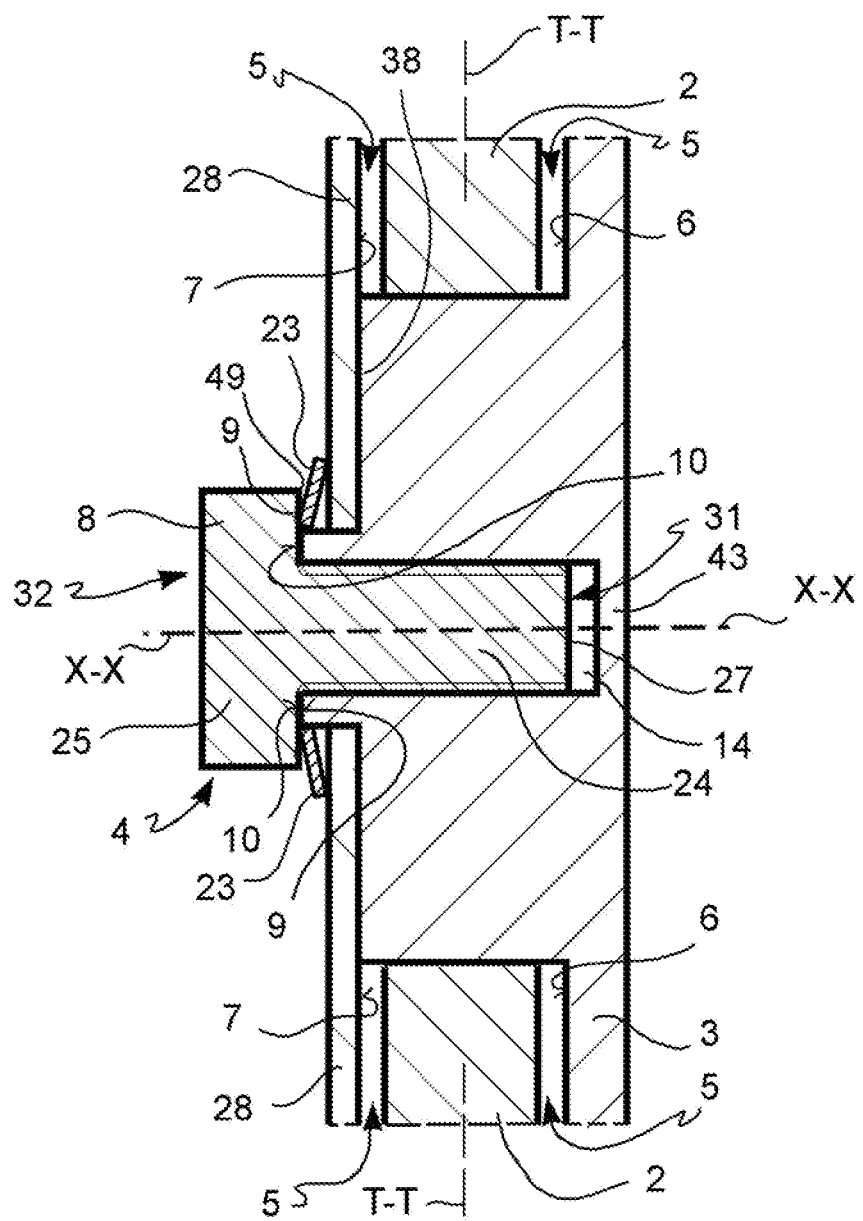
FIG. 14 is a section view taken along a cutting plane directed along the axial and tangential directions, which shows a portion of a brake disc assembly comprising a connecting device, according to an embodiment.
Figure 15:
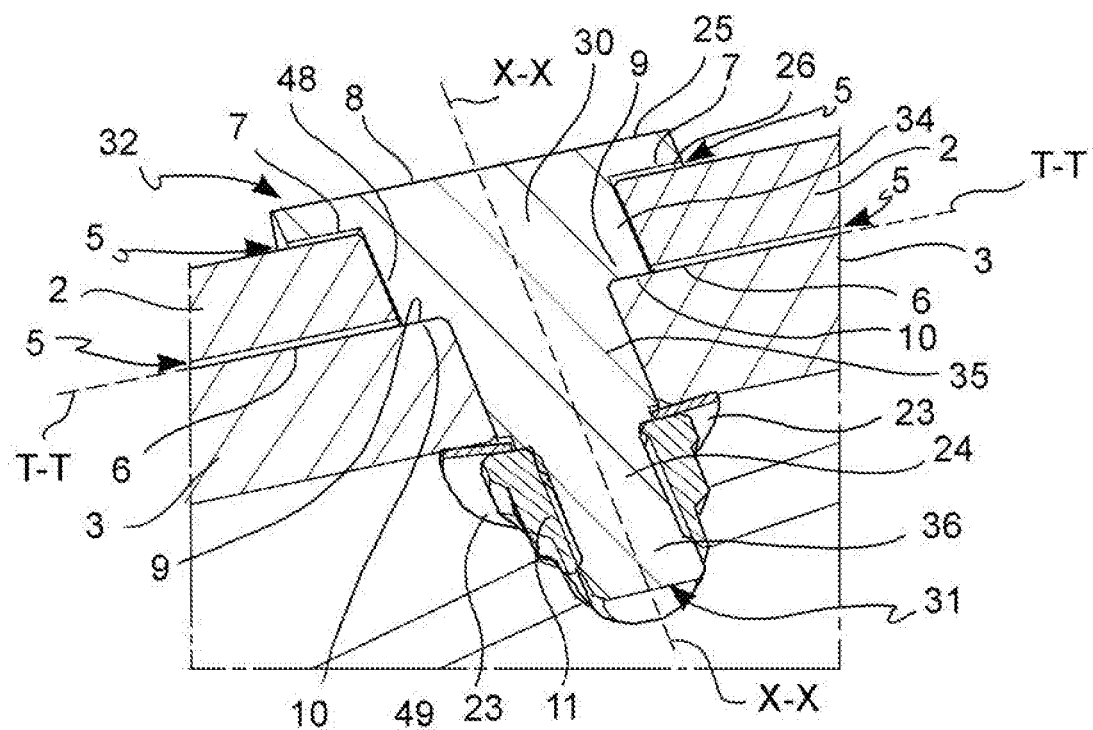
FIG. 15 is an axonometric and section view taken along a cutting plane directed along the axial and tangential directions of a portion of said brake disc assembly, according to an embodiment.
Figure 16:
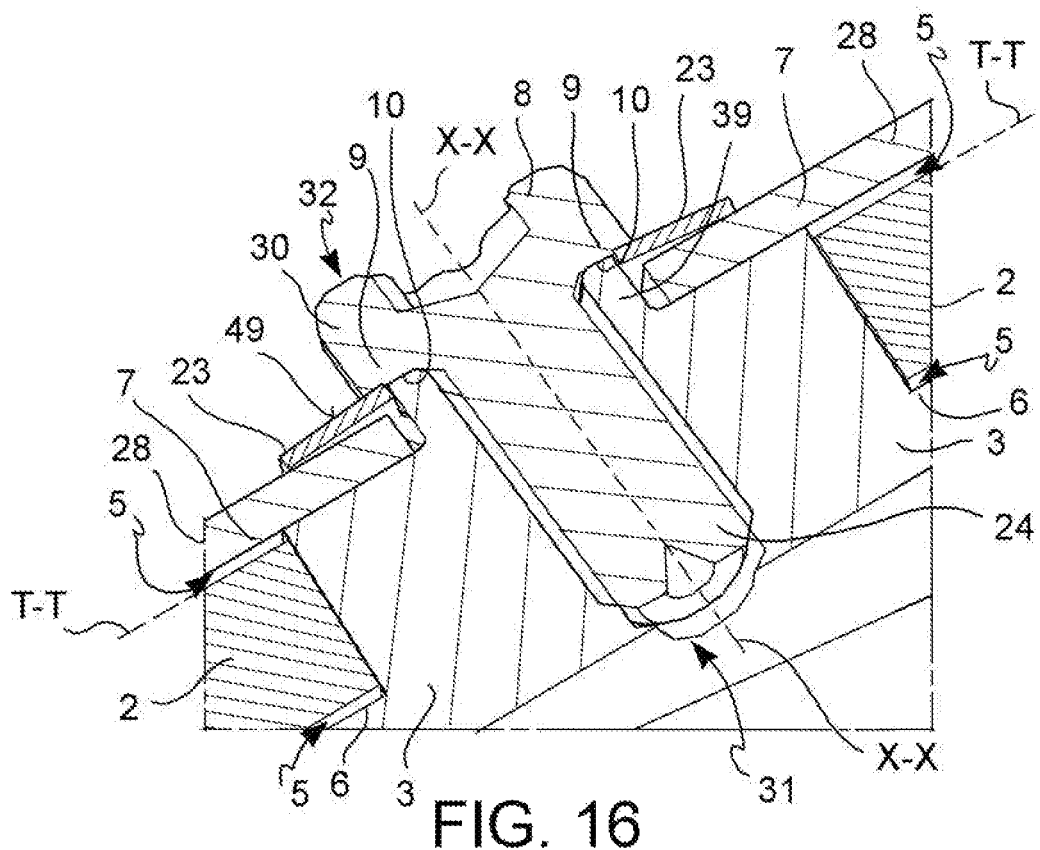
FIG. 16 is an axonometric and section view taken along a cutting plane directed along the axial and tangential directions of a portion of said brake disc assembly, according to an embodiment.

A brake disc 1 is provided according to a general embodiment.

Said brake disc assembly 1 is adapted to rotate about a rotation axis. Said disc brake assembly 1 defines an axial direction X-X either coinciding with or parallel to the rotation axis, a radial direction R-R orthogonal to the axial direction X-X, and a tangential T-T or circumferential direction T-T, orthogonal to both the axial direction X-X and to the radial direction R-R.

Said brake disc assembly 1 comprises a brake band 2, comprising at least two opposite braking surfaces 12, 13, adapted to cooperate with at least one brake caliper associable with the brake disc assembly 1 to apply a braking action.

According to an embodiment, said brake band 2 is a ventilated brake band comprising two flares 15, 16 arranged mutually side-by-side, coaxial to the same axial direction X-X and spaced apart in the axial direction X-X with respect to one another so as to define at least one gap 17. Preferably, each of said two flares 15, 16 comprises one of said braking surfaces 12, 13. Preferably, said two flares 15, 16 are connected to each other by flare connecting pins 18.

Said brake disc assembly 1 comprises a bell 3, adapted to be operatively connected to a vehicle wheel associable with the brake disc assembly 1.

According to an embodiment, said brake band 2 comprises a vehicle-oriented band side 20, adapted to face the vehicle, and an opposite vehicle side band 19 or wheel-oriented band side 19, axially opposite to said vehicle-oriented band side 20 and adapted to face a vehicle wheel. Preferably, said bell 3 is associated with said wheel-oriented band side 19 of at least one portion of the brake band 2.

According to an embodiment, said brake band 2 comprises at least one connecting protrusion 22, which extends in radial direction R-R from said brake band 2 towards the rotation axis of the brake disc assembly 1 and adapted to be associated with said bell 3.

Said brake disc assembly 1 comprises at least one connecting device 4, which forms a connection between said brake band 2 and said bell 3. Preferably, said at least one connecting device 4 is made as a piece which is separate from both the brake band 2 and said bell 3.

Said connecting device 4 and said bell 3 cooperate by delimiting at least one axial band seat 5 where the brake band 2 may slide in an axial direction X-X by a predetermined axial stroke. According to a preferred embodiment, said brake band 2 may slide in said axial band seat 5 of said predetermined axial stroke without being biased.

Said bell 3 comprises at least one first end-of-stroke surface 6 which forms a first abutment surface in the axial direction X-X for said brake band 2.

According to a preferred embodiment, said connecting device 4 comprises a second opposite end-of-stroke surface 7, which forms a second opposite abutment surface in the axial direction X-X for said brake band 2.

According to an embodiment, said first end-of-stroke surface 6 of the bell 3 and said second opposite end-of-stroke surface 7 of the connecting device 4 delimit said axial band seat 5.

Said connecting device 4 comprises at least one male element 8, which is accommodated in at least one female element bell seat 14 obtained in said bell 3. According to a preferred embodiment, said male element bell seat 14 of the bell 3 defines, on said bell 3, an opening which is substantially circular in shape for accessing the seat.

Said male element 8 of the connecting device 4 comprises at least one bell abutment surface 9.

Said bell 3 comprises at least one male element abutment surface 10.

Advantageously, said bell abutment surface 9 of the male element 8 forms an abutment surface in axial direction X-X for said male element abutment surface 10 of the bell 3, whereby preventing said connecting device 4 and said bell 3 from tightening said brake band 2 therebetween.

In this manner, a brake disc assembly 1 can be provided in which the brake band 2 can slide axially with a predetermined axial stroke, avoiding jamming of the disc as well as stresses on the disc during the braking action, when the disc is clamped between the opposite brake pads of an associated brake caliper adapted to straddle the brake band 2.

Said male element 8 has a male element body 30.

According to a preferred embodiment, said bell abutment surface 9 of the male element 8 which receives the direct support of the bell 3 is made in one piece with said male element body 30. In other words, said bell abutment surface 9 of the male element 8 which receives the direct support of the bell 3 is made in one piece with said male element body 30. In this manner, said male element body 30 is made in one piece and comprises said bell abutment surface 9.

Providing said male element 8 of the connecting device 4 in a single piece prevents said connecting element 4 from comprising one or more bushes fitted, e.g. screwed, onto said male element 8 in order to form abutments for the bell or for the brake band 2.

By providing such connecting device 4 said bell 3 and said connecting device 8 can cooperate to form said first end-of-stroke surface 6 and said second opposite end-of-stroke surface 7, whereby delimiting said axial band seat 5 in which the brake band 2 can slide axially free and unbiased, and at the same time said male element 8 can form an axial abutment for said bell 3. In this manner, tightly clamping said brake band 2 is avoided and at the same time the sliding of said bell 3 with respect to said male element 4 is prevented, whereby making it possible to make the bell 3 of material which is soft and therefore light or at least softer and lighter than the material with which the brake band 2 is made.

According to a preferred embodiment, said bell 3 is made of aluminum or aluminum alloy.

According to a preferred embodiment, said male element body 30 has a predominant extension along a longitudinal direction Z-Z and comprises a vehicle-oriented male element side 32, adapted to face the vehicle, when under operating conditions, and an opposite vehicle male element opposite side 31 or wheel-oriented male element side 31 opposite to said vehicle-oriented male element side 32 and adapted to face a vehicle wheel, when under operating conditions. Preferably, said male element body 30 comprises said axial bell abutment surface 9 and a brake band abutment surface, forming a direct or indirect axial abutment surface, through the interposition of at least one of a connecting ring 28 and an elastic element 23, for said brake band 2, wherein said axial bell abutment surface 9 and said brake band abutment surface are oriented towards the same side. Preferably, said wheel-oriented male element side 31 comprises both said axial bell abutment surface 9 and said brake band abutment surface. In other words, said bell axial abutment surface 9 and said brake band abutment surface are both adapted to face a same vehicle wheel, in operating conditions.

Preferably, when under operating conditions, said longitudinal direction Z-Z of said male element 8 is either parallel to or coincident with the axial direction X-X.

According to an embodiment, said male element body 30 of said male element 8 comprises a head 25 comprising an underhead portion 26 and a stem 24 which extends from said underhead portion 26. According to an embodiment, said stem 24 overhangs from said underhead portion 26 forming a stem free end 27.

According to a preferred embodiment, said male element 8 is inserted in at least said bell male element seat 14 from said vehicle-oriented axial side 20 of the brake band 2.

According to an embodiment, said brake band 2, preferably said connecting protuberance 22 of the brake band 2, comprises at least one band male element seat 21 which receives at least one portion of said male element 8. According to an embodiment, said band male element seat 21 defines, on said brake band 2, an access opening which is substantially quadrilateral in shape.

According to an embodiment, during the insertion of said male element 8 in the bell male element seat 14, said free end 27 of the stem 24 of the male element 8 is inserted firstly into said band male element seat 21 and then into said bell male element seat 14.

According to an embodiment, during the assembly of said male element 8, said free end 27 of the stem 24 of the male element 8 is inserted firstly into said male ring element seat 29 and then into said bell male element seat 14.

According to an embodiment, said stem 24 of the male element body 8 comprises a first stem portion 34 or stem proximal portion 34 which forms a step with said head 25, so that at least one surface of said underhead portion 26 is adapted to face said wheel-oriented male element side 31. According to an embodiment, said proximal stem portion 34 is directly connected to said head 25. According to an embodiment, said proximal steam portion 34 extends from said underhead portion 26.

According to an embodiment, said stem 24 of the male element body 8 comprises a second stem portion 35 or stem intermediate portion 35, which forms a step with said stem proximal portion 34, so that at least one surface of said stem proximal portion 34 is adapted to face said wheel-oriented male element side 31. According to an embodiment, said stem proximal portion 34 has a surface forming said bell abutment surface 9 facing said stem intermediate portion 35. According to an embodiment, said stem proximal portion 34 comprises said bell abutment surface 9. According to an embodiment, said stem intermediate portion 35 comprises said bell abutment surface 9.

According to an embodiment, said stem 24 of the male element body 8 comprises a third stem portion 36 or stem distal portion 36, which forms a step with said stem intermediate portion 35, so that at least one surface of said stem intermediate portion is adapted to face said wheel-oriented male element side 31.

According to an embodiment, said connecting device 4 comprises at least one elastic element 23 which applies a direct elastic biasing action to axially tightly clamp said bell 3 and said connecting device 4 to one another, thereby avoiding elastically biasing the brake band 2.

According to a preferred embodiment, said elastic element 23 has a substantially annular shape which embraces a portion of the stem 24 of said male element 8. According to a preferred embodiment, said elastic element 23 is a Belleville washer.

According to an embodiment, said elastic element 23 forms a barrier, preferably around the body of said male element 8, to limit the introduction and accumulation of dust and/or debris in the male element seat 21 of band 21. According to an embodiment, said elastic element 23 forms a barrier, preferably about the body of said male element 8, to prevent dust and/or debris from entering and accumulating at least in the bell male element seat 14.

According to an embodiment, said elastic element 23 comprises a dustproof wall 49 of elastic element embracing at least one portion of said stem 24 of the male element 8 to limit the entry and accumulation of dust and/or debris in the male element seat 21 of the band and to prevent dust and/or debris from entering and accumulating at least in the male element seat 14 of the bell.

By providing such elastic element 23 the accumulation and stratification of dust and debris is prevented and in the band male element seat 21 which can prevent the axial float of the brake band in the band seat. At the same time, the stratification of dust and debris covering the portions of the disc brake employed to transmit the braking action by feeding in tangential direction T-T is avoided. At the same time, said elastic element 23 applies an elastic biasing action aimed at ensuring the axial float of the brake band 2, tightly clamping the bell 3 and avoiding to tightly clamp the brake band 3. It also prevents dust or debris from deteriorating the walls of the bell 3 which form the bell male element seat 14.

Providing such an elastic element 23 makes it possible to keep the accesses to the bell and brake band seats adapted to receive the male connecting elements as isolated from the surrounding environment as possible, whereby minimizing the introduction of dust and debris, e.g. debris of friction material of the brake pads and, particularly for applications on rally or off-road vehicles, the dust raised from the rough road surface, accumulation of such dust and debris which may form layers of additional material which imply a significant deterioration of the axial mobility of the components of the brake disc with respect to the axial position of the caliper body, with the risk of causing plastic deformations of the brake disc when tightly clamped by the brake pads during the braking action.

According to a preferred embodiment, said male element 8 is a pin 8.

According to an embodiment, said elastic element 23 biases the male element abutment surface 10 of the bell 3 abutting against the bell abutment surface 9 of the male element 8. In this manner, said elastic element 23 elastically biases said first end-of-stroke surface 6 of the bell 3 towards said second end-of-stroke surface 7, whereby avoiding elastically biasing the brake band 2.

According to an embodiment, said elastic element 23 biases at least one of said first end-of-stroke surface 6 of the bell 3 and said second end-of-stroke surface 7 of the connecting device 4 abutting against an abutment surface of the male element body 30 or of the bell 3, respectively, so as to provide at least one of said first end-of-stroke surface 6 and said second end-of-stroke surface 7 with a minimum yield. In this manner, it is possible to limit the damage to the brake band in the case of axial shock pulses against the walls of said band axial seat 5.

According to an embodiment, said connecting device 4 comprises at least one connecting ring 28. According to an embodiment, said connecting ring 28 comprises said second opposite end-of-stroke surface 7. According to an embodiment, said connecting ring 28 delimits at least one male ring element seat 29 which receives at least one portion of said male element 8.

According to an embodiment, said at least one connecting protuberance 22 of the brake band 2 comprises two tangentially opposite feeding walls 40, adapted to transmit the feeding action in tangential direction T-T between the brake band 2 and the bell 3. In this manner, a brake disc assembly 1 with teeth feeding is provided. Preferably, said at least one connecting protuberance 22 of the brake band 2 is interposed between two connecting protrusions 41 of the bell 3. Preferably, said connecting protrusions 41 of the bell 3 comprise counter-feeding walls 42, at least one of said counter-feeding walls 42 of the bell 3 cooperates with at least one of said feeding walls 40 of the brake band 2 to transmit the braking action of the brake band to the bell 3. According to an embodiment, said connecting protrusions 41 of the bell 3 extend in axial direction X-X from said first end-of-stroke wall 6 of the bell. According to an embodiment, at least one of said connecting protrusions 41 of the bell 3 comprises said axially facing ring abutment surface 38.

According to an embodiment, said underhead portion 26 of the male element 8 comprises said opposite end-of-stroke surface 7. In this manner, said axial band seat 5 is delimited by said first end-of-stroke surface 6 of the bell 3 and from said second opposite end-of-stroke surface 7 of the underhead portion 26 of the male element 8.

According to an embodiment, said first end-of-stroke surface 6 of the bell 3 is axially flush with said male element abutment surface 10 of the bell 3. According to an embodiment, said first end-of-stroke surface 6 of the bell 3 and said male element abutment surface 10 of the bell 3 are two portions of the same surface. According to an embodiment, said first end-of-stroke surface 6 of the bell 3 and said male element abutment surface 10 of the bell 3 are two substantially annular portions of the same surface, wherein said first end-of-stroke surface 6 substantially surrounds said male element abutment surface 10.

According to an embodiment, said connecting device 4 comprises at least one connecting ring 28 which is fixed by means of said male element 8 to at least said bell 3, said connecting ring 28 forming said second end-of-stroke surface 7 of the axial band seat 5. Preferably, said elastic element 23 elastically biases said connecting ring 28 abutting against a ring abutment surface 38 of said bell 3. For example, said connecting ring 28 is made of steel.

According to an embodiment, said bell 3 comprises at least one seat edge portion 39 which surrounds the inlet of said at least one male bell element seat 14 forming an axial protrusion which has a male element abutment surface 10 abutting against said underhead portion 26 of the male element body 30, in other words against said bell abutment surface 9 of the body of the male element 30 which is comprised in said underhead portion 26. In this manner, the male element 8 abuts against the bell 3 and this prevents the male element 8 from tightly clamping said brake band 2.

According to an embodiment, said bell male element seat 14 is substantially cup-shaped and comprises a seat bottom wall 43. In this manner, said bell male element seat 14 is a blind hole accessible exclusively by said male element 8 from the side of the bell 3 facing said brake band 2, in other words from the vehicle-oriented bell side 44. According to an embodiment, said bell 3 further comprises a side opposite bell vehicle 45 or side of the bell facing wheel 45, axially opposite to said vehicle-oriented bell side 44 and adapted to face a vehicle wheel.

According to an embodiment, said male element seat 14 of the bell is a through hole, preferably putting into communication one vehicle-oriented bell side 44 with a wheel-oriented bell side 45.

According to an embodiment, said connecting device 4 comprises at least one nut 11 fitted, e.g. screwed, onto a portion of said stem 24, wherein said nut 11 forms an axial reference abutment for said elastic element 23. In this manner, said elastic element 23 applies an elastic biasing action between said nut 11 and said bell 3, to make said male element abutment surface 10 of the bell 3 to abut against said bell abutment surface 9 of the male element body 8.

According to an embodiment, said nut 11 cooperates with said elastic element 23 to limit the entry and accumulation of dusts and/or debris in the male element seat 21 of the band. According to an embodiment, said nut 11 cooperates with said elastic element 23 to prevent the entry of dust and/or debris at least into the bell male element seat 14.

According to an embodiment, said stem 24 of the male element 8 comprises at least one threaded portion.

According to an embodiment, said intermediate stem portion 35 comprises an abutment surface for nut 37, which forms a reference abutment for said nut 11. In this manner, said nut 11 avoids being tightened against said bell 3, e.g. by being screwed against said bell. According to an embodiment, said distal stem portion 36 is externally threaded.

According to an embodiment, said male element body 30 comprises said abutment surface for nut 37 in a single piece.

According to an embodiment, said nut abutment surface 37 faces towards the same side of said bell abutment surface 9 and said second end-of-stroke surface 7.

According to an embodiment, said at least one connecting protrusion 22 comprises said band male element seat 21 which receives said male element 8 so as to transmit the tangential braking action from the brake band 2 to said male element body 30. Preferably, said male element body 30 comprises at least two tangentially opposite tangential walls 48 which cooperate with the walls of said seat of the band male element 21 to transfer the tangential braking action from the brake band 2 to said male element 8. According to an embodiment, said proximal stem portion 34 of said male element body 30 comprises said opposite tangential walls 48.

According to an embodiment, said male element body 30, preferably said intermediate stem portion 35, comprises said two opposite feeding walls 40 and said bell 3 comprises said counter-feeding walls 42 to delimit said bell male element seat 14 to transmit the tangential braking action from the brake band 2 to the bell 3, by means of said male element 8. In this manner, a brake disc assembly 1 is provided with feeding by means of a third element, e.g. a male element 8.

According to an embodiment, the extension in longitudinal direction Z-Z of said stem proximal portion 34 of said male element body 30 is smaller than the extension in axial direction X-X of the band axial seat 5. This ensures said predetermined axial stroke of the brake band 2.

According to an embodiment, said connecting device 4 comprises a plurality of said male elements 8, mutually and tangentially spaced by a predetermined circumferential distance.

According to an embodiment, said male element body 30 is integrally made in one piece, whereby avoiding to delimit through holes longitudinally directed in said male element body 30.

According to a variant embodiment, said body of the male element 30 is longitudinally hollow for at least one portion of the longitudinal extension of the stem 24.

According to a variant embodiment, said male element 8 is a bushing.

According to an embodiment, said male element body 30 is symmetrical with respect to at least one definable longitudinal plane parallel to said longitudinal direction Z-Z.

According to an embodiment, said predetermined axial stroke of the brake band 2 is less than 1 millimeter, preferably less than 0.5 millimeters. According to a preferred embodiment, said predetermined axial stroke of the brake band 2 is substantially equal to 0.3 millimeters.

According to a general embodiment, a male element 8 of a connecting device 4 is provided, adapted to form a connection between a brake band 2 and a bell 3 of a brake disc assembly 1, said connecting device 4 and said bell 3 being adapted to cooperate to delimit at least one axial band seat 5 in which the brake band 2 may slide in an axial direction X-X of a predetermined axial stroke.

According to a preferred embodiment, said male element 8 comprises a male element body 30. Preferably, said male element body 30 has a predominant extension along a longitudinal direction Z-Z and comprises a vehicle-oriented male element side 32, adapted to face the vehicle, when under operating conditions, and an opposite vehicle male element opposite side 31 or a wheel-oriented male element side 31 opposite to said vehicle-oriented male element side 32 and adapted to face a vehicle wheel, when under operating conditions.

According to a preferred embodiment, said male element body 30 comprises at least one bell abutment surface 9, adapted to form an abutment surface for a portion of said bell 3.

Preferably, said male element body 30 comprises said axial bell abutment surface 9 and a brake band abutment surface, forming a direct or indirect axial abutment surface, through the interposition of at least one of a connecting ring 28 and an elastic element 23, for said brake band 2, wherein said axial bell abutment surface 9 and said brake band abutment surface are oriented on the same side.

According to an embodiment, said male element body 30 comprises at least one second end-of-stroke surface 7, opposite to a first end-of-stroke surface 6 of the bell 3 and adapted to form an abutment surface for said brake band 2.

Preferably, said second end-of-stroke surface 7 and said bell abutment surface 9 are made in one piece with said male element body 30.

According to an embodiment, said male element body 30 comprises a head 25 comprising an underhead portion 26 and a stem which extends from said underhead portion 26, said stem 24 comprises a first stem portion 34 which forms a step with said head 25, so that at least one surface of said underhead portion is adapted to face said wheel-oriented male element side 31. Preferably, said underhead portion, adapted to face said wheel-oriented male element side 31, comprises said second end-of-stroke surface 7.

According to an embodiment, said stem 24 comprises a second stem portion 35 which forms a step with said proximal stem portion 34, so that a surface of said proximal stem portion 34 is adapted to face said wheel-oriented male element side 31. Preferably, said surface of said proximal stem portion 34 adapted to face said wheel-oriented male element side 31 comprises said bell abutment surface 9.

Preferably, said bell abutment surface 9 and said second end-of-stroke surface 7 are oriented towards the same side of the male element body 30, preferably said wheel-oriented male element side 31.

By virtue of the features described above, either separately or mutually in combination with particular embodiments, it is possible to obtain a brake disc assembly and a male element capable of responding to the aforesaid, sometimes contrasting needs, and in particular:

it makes it possible to provide a disc brake solution in which the brake band is free to slide or float axially by a predetermined axial stroke with respect to the bell, so as to be arranged in the desired axial position between the brake pads of an associable caliper body during the braking action;

at the same time, it forms a barrier which prevents, or at least minimizes with respect to known solutions, the introduction of dust and debris into the coupling between brake band and bell, thereby avoiding their accumulation and stratification, thus improving the performance of the disc brake in this manner, particularly for applications on high-performance or racing vehicles, without reducing the working life of the brake disc;

the suggested solution makes it possible to close the coupling between bell and connection device, whereby preventing the introduction of dust and debris into the coupling between the bell and the male element of the connecting device, so as to avoid deteriorating the surfaces of the bell, which can therefore be advantageously made of softer, and thus lighter, material with respect to the brake band, without risking premature wear;

the suggested solution makes it possible to isolate the coupling between bell and connection device from dust and debris and at the same time applies an axial elastic bias aimed at axially tightly clamping the bell, while leaving a predetermined axial float to the brake band;

the suggested solution makes it possible to tightly clamp the bell defining at the same time an axial band seat in order to allow the axial float of the brake band, and at the same time it makes it possible to avoid, or at least minimize, the introduction of dust and debris in the connection between bell and connection device;

at the same time, it prevents tightly clamping the brake band and it avoids applying an elastic bias on the brake band;

at the same time, it avoids the sliding of the bell on the male connecting element with the brake band, making it possible to make the bell in soft, and therefore light, material;

a connecting male element is obtained between brake band and bell having surfaces adapted to form reference abutments for the bell and either directly or indirectly for the brake band made in one piece with the body of said male connecting element;

a connecting male element is obtained between brake band and bell having surfaces adapted to form reference abutments for the bell and either directly or indirectly for the brake band either facing or oriented towards the same side;

it makes it possible to obtain a male connecting element between brake band and bell adapted to transfer the tangential feeding action between brake band and bell and at the same time is adapted to ensure said axial stroke of the brake band.

A person skilled in the art may make many changes, adaptations and replacements to the embodiments described above or may replace elements with others which are functionally equivalent in order to satisfy contingent needs without however departing from the scope of protection of the appended claims.

LIST OF REFERENCES

1 Brake disc assembly
2 Brake band
3 Bell
4 Connecting device
5 Axial band seat
6 First end-of-stroke surface of the bell
7 Second end-of-stroke surface of the connecting device
8 Male element of the connecting device
9 Axial abutment surface for bell of the male element
10 Axial abutment surface for male element of the bell
11 Nut of the connecting device
12 First braking surface of the brake band
13 Second opposite braking surface of the brake band
14 Male element seat of the bell
15 First flare of the brake band
16 Second flare of the brake band
17 Brake band gap
18 Brake band flare connecting pin
19 Wheel-oriented axial side of the brake band or brake band opposite vehicle side
20 Vehicle-oriented axial side of the brake band
21 Brake band male element seat or band male element seat
22 Brake band connecting protuberance
23 Connecting device elastic means 24 Male element stem
25 Male element head
26 Underhead portion of the male element
27 Stem free end
28 Connection device connecting ring
29 Connecting ring male element seat or ring male element seat
30 Male element body
31 Wheel-oriented male element side, or male element opposite vehicle side
32 Vehicle-oriented male element side
34 First stem portion or proximal stem portion
35 Second stem portion or intermediate stem portion
36 Third stem portion or distal stem portion
37 Male element nut axial abutment surface
38 Bell ring abutment surface
39 Bell seat edge
40 Feeding wall
41 Bell feeding protrusion
42 Counter-feeding wall
43 Seat bottom wall of bell male element seat
44 Vehicle-oriented bell side
45 Bell opposite vehicle side or bell wheel-oriented side
48 Male element tangential walls
49 Dust-proof wall of elastic element
X-X Axial direction
R-R Radial direction
T-T Tangential or circumferential direction
Z-Z Longitudinal direction of the male element

The invention claimed is:

1. A brake disc assembly comprising:
a brake band,
a bell, adapted to be operatively connected to a vehicle wheel associable with the brake disc assembly;
at least one connecting device, which forms a connection between said brake band and said bell;
said connecting device and said bell cooperate by delimiting at least one axial band seat where the brake band may slide in an axial direction of a predetermined axial stroke;
wherein:
said bell comprises at least a first end-of-stroke surface which forms a first abutment surface in the axial direction for said brake band;
said connecting device comprises a second end-of-stroke surface, opposite to said first end-of-stroke surface, which forms a second opposite abutment surface in the axial direction for said brake band;
and wherein:
said connecting device comprises at least one male element, which is accommodated in at least one male element bell seat obtained in said bell;
said male element comprises at least one bell abutment surface;
said bell comprises at least one male element abutment surface;
said bell abutment surface of the male element being an abutment surface in the axial direction for said male element abutment surface of the bell so as to avoid said connecting device and said bell from tightening said brake band therebetween;
wherein said male element has a male element body, wherein said bell abutment surface of the male element receiving the direct support of the bell is made in one piece with said male element body; and
said male element body is integrally made in one piece, avoiding to delimit through holes longitudinally directed in said male element body, and
wherein said male element body of said male element comprise a head comprising an underhead portion and a stem which extends from said underhead portion, and
said stem of the male element comprises at least one threaded portion.

2. The brake disc assembly according to claim 1, wherein said brake band may slide in said axial band seat of said predetermined axial stroke without being biased; and
said predetermined axial stroke of the brake band is less than 0.5 millimeters; and
and said bell is made of aluminum or aluminum alloy.

3. The brake disc assembly according to claim 1, wherein a stem of the male element body comprises a proximal stem portion which forms a step with a head, so that at least one surface of an underhead portion is adapted to face said wheel-oriented male element side; and
said stem of the male element body comprises an intermediate stem portion which forms a step with said proximal stem portion, so that a surface of said proximal stem portion is adapted to face said wheel-oriented male element side; and
said proximal stem portion has a surface forming said bell abutment surface facing said intermediate stem portion; and
said stem of the male element body comprises a distal stem portion which forms a step with said intermediate stem portion so that at least one surface of said intermediate stem portion is adapted to face said wheel-oriented male element side.

4. The brake disc assembly according to claim 1, wherein said connecting device comprises at least one elastic element which exerts an elastic bias aimed at axially tightening said bell and said connecting device together and
said elastic element is substantially annular in shape to embrace a portion of a stem of said male element; and
said elastic element biases the male element abutment surface of the bell abutting against the bell abutment surface of the male element, so that said elastic element elastically biases said first end-of-stroke surface of the bell when approaching said second end-of-stroke surface and
said elastic element biases at least one of said first end-of-stroke surface of the bell and said second end-of-stroke surface of the connecting device abutting against an abutment surface of the male element body or of the bell, respectively, so as to provide at least one of said first end-of-stroke surface and said second end-of-stroke surface with a minimum compliance; and
said elastic element comprises a dustproof wall of elastic element embracing at least one portion of said stem of the male element to limit the entry and accumulation of dusts and/or debris in the male element seat of the band and to prevent dusts and/or debris from entering and accumulating at least in the male element seat of the bell; and
said male element seat of the bell is a through hole, including putting into communication one vehicle-oriented bell side with a wheel-oriented bell side.

5. The brake disc assembly according to claim 1, wherein said connecting device comprises at least one connecting ring which is fixed by of said male element to at least said bell, said connecting ring abutting said second end-of-stroke surface of the axial band seat; and an elastic element elastically biases said connecting ring abutting against a ring abutment surface of said bell.

6. The brake disc assembly according to claim 1, wherein said underhead portion of the male element comprises said second opposite end-of-stroke surface so that said axial band seat is delimited by said first end-of-stroke surface of the bell and by said second opposite end-of-stroke surface of the underhead portion of the male element; and said first end-of-stroke surface of the bell is axially flush with said male element abutment surface of the bell; and said first end-of-stroke surface of the bell and said male element abutment surface of the bell are two substantially annular portions of the same surface, wherein said first end-of-stroke surface substantially surrounds said male element abutment surface; and said connecting device comprises at least one nut fitted onto a portion of said stem, wherein said nut forms an axial abutment surface for an elastic element so that said elastic element exerts an elastic bias between said nut and said bell, in order to abut said male element abutment surface of the bell against said bell abutment surface of the male element body; and said brake band comprises at least one male element seat of the band which accommodates at least one portion of said male element; and said male element seat of the band defines, on said brake band, an opening which is substantially quadrilateral in shape for accessing the seat; and said male element bell seat of the bell defines, on said bell, an opening which is substantially circular in shape for accessing the seat; and said nut cooperates with said elastic element to limit the entry and accumulation of dusts and/or debris in the male element seat of the band.

7. A male element of a connecting device adapted to form a connection between a brake band and a bell of a brake disc assembly, said connecting device and said bell being adapted to cooperate to delimit at least one axial band seat where the brake band may slide in an axial direction of a predetermined axial stroke;

wherein said male element comprises a male element body having a predominant extension along a longitudinal direction; said male element body comprising a vehicle-oriented male element side, adapted to face a vehicle, when under operating conditions, and a wheel-oriented male element side opposite to said vehicle-oriented male element side and adapted to face a vehicle wheel, when under operating conditions; and wherein said male element body comprises at least a second end-of-stroke surface, opposite to a first end-of-stroke surface of the bell and adapted to form an abutment surface for said brake band;

said male element body comprises at least one bell abutment surface, adapted to form an abutment surface for a portion of said bell;

and wherein said second end-of-stroke surface and said bell abutment surface are made in one piece with said male element body, and said male element body is integrally made in one piece, avoiding to delimit through holes longitudinally directed in said male element body, and wherein said male element body of said male element comprise a head comprising an underhead portion and a stem which extends from said underhead portion, and said stem of the male element comprises at least one threaded portion.

8. The male element according to claim 7, and said stem comprises a first stem portion which forms a step with said head, so that at least one surface of said underhead portion is adapted to face said wheel-oriented male element side; and said underhead portion, adapted to face said wheel-oriented male element side, comprises said second end-of-stroke surface; and said stem comprises a second stem portion which forms a step with said proximal stem portion, so that a surface of said proximal stem portion is adapted to face said wheel-oriented male element side; and said surface of said proximal stem portion adapted to face said wheel-oriented male element side comprises said bell abutment surface; and said bell abutment surface and said second end-of-stroke surface are oriented towards the same side of the male element body, wherein said same side of the male element body comprises said wheel-oriented male element side.

9. A brake disc assembly comprising:

a brake band;

a bell, adapted to be operatively connected to a vehicle wheel associable with the brake disc assembly;

at least one connecting device, which forms a connection between said brake band and said bell;

said connecting device and said bell cooperate by delimiting at least one axial band seat where the brake band may slide in an axial direction of a predetermined axial stroke;

wherein:

said bell comprises at least a first end-of-stroke surface which forms a first abutment surface in the axial direction for said brake band;

and wherein:

said connecting device comprises at least one male element, which is accommodated in at least one male element bell seat obtained in said bell;

said male element comprises at least one bell abutment surface;

said bell comprises at least one male element abutment surface;

said bell abutment surface of the male element being forming an abutment surface in the axial direction for said male element abutment surface of the bell so as to avoid said connecting device and said bell from tightening said brake band therebetween;

said male element body has a predominant extension along a longitudinal direction and comprises a vehicle-oriented male element side, adapted to face the vehicle, when under operating conditions, and a wheel-oriented male element side opposite to said vehicle-oriented male element side and adapted to face a vehicle wheel, when under operating conditions;

wherein said male element body comprises said axial bell abutment surface and a brake band abutment surface, forming a direct or indirect axial abutment surface, through the interposition of at least one of a connecting ring and an elastic element, for said brake band;

and wherein said axial bell abutment surface and said brake band abutment surface are oriented towards the same side, and said male element body is integrally made in one piece, avoiding to delimit through holes longitudinally directed in said male element body, and wherein said male element body of said male element comprise a head comprising an underhead portion and a stem which extends from said underhead portion, and said stem of the male element comprises at least one threaded portion.

10. The brake disc assembly according to claim 9, wherein said wheel-oriented male element side comprises both said axial bell abutment surface and said brake band abutment surface; and when under operating conditions, said longitudinal direction of said male element is parallel to or coincident with the axial direction.

* * * * *

UNITED STATES PATENT AND TRADEMARK OFFICE
CERTIFICATE OF CORRECTION

PATENT NO. : 11,428,283 B2
APPLICATION NO. : 16/643021
DATED : August 30, 2022
INVENTOR(S) : Matti et al.

Page 1 of 1

It is certified that error appears in the above-identified patent and that said Letters Patent is hereby corrected as shown below:

In the Claims

Claim 2, Column 14, Line 13 and 14, there is a duplicate "and" delete an "and"
Claim 5, Column 14, Line 65, "of" should be deleted
Claim 9, Column 16, Line 46, "forming" should be deleted Signed and Sealed this
Thirteenth Day of December, 2022

*Katherine Kelly Vidal*

Katherine Kelly Vidal
*Director of the United States Patent and Trademark Office*